United States Patent [19]
Chahrouri

[11] 3,822,971
[45] July 9, 1974

[54] ROTARY PISTON ENGINE
[76] Inventor: Kamal Najib Chahrouri, P.O. Box 869, Beirut, Lebanon
[22] Filed: Nov. 1, 1972
[21] Appl. No.: 302,663

[52] U.S. Cl. ............................................... 418/36
[51] Int. Cl. .......................................... F01c 1/00
[58] Field of Search ................................. 418/36

[56] References Cited
UNITED STATES PATENTS

| | | | |
|---|---|---|---|
| 1,095,034 | 4/1914 | Sanchez et al. | 418/36 |
| 2,342,515 | 2/1944 | Morgenstern | 418/36 |
| 3,034,486 | 5/1962 | Buxton | 418/36 |
| 3,061,180 | 10/1962 | Durgin | 418/36 |
| 3,112,062 | 11/1963 | Way | 418/36 |
| 3,302,625 | 2/1967 | Cunningham | 418/36 |

FOREIGN PATENTS OR APPLICATIONS

| | | | |
|---|---|---|---|
| 684,714 | 11/1929 | France | 418/36 |
| 642,255 | 12/1962 | Italy | 418/36 |

*Primary Examiner*—C. J. Husar
*Attorney, Agent, or Firm*—Kenyon & Kenyon Reilly Carr & Chapin

[57] ABSTRACT

A rotary piston engine having a toroidal cylinder in which pistons accelerate and decelerate has the pistons connected to a rotary shaft by gear trains which need comprise only four gears.

6 Claims, 9 Drawing Figures

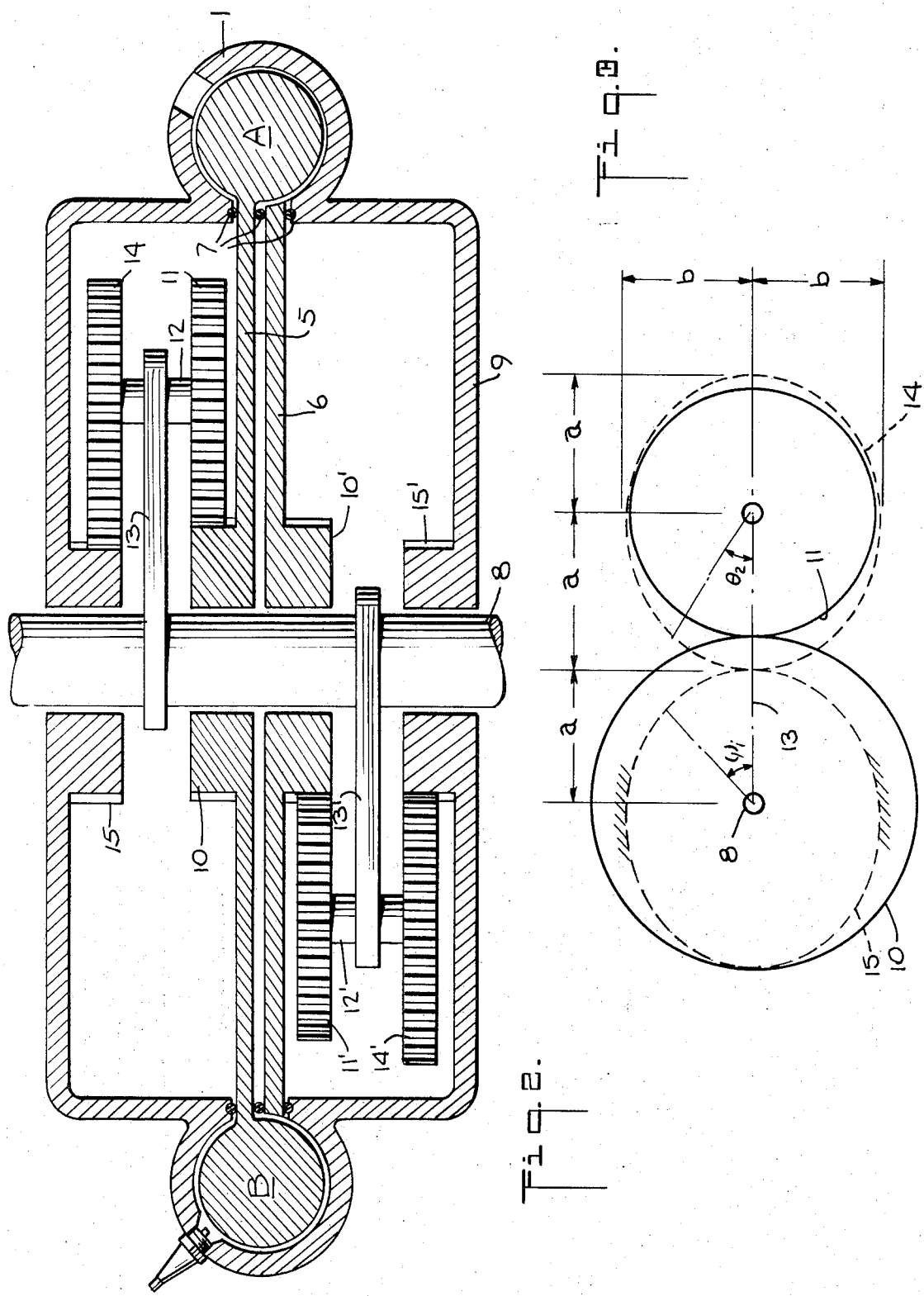

ROTARY PISTON ENGINE

BACKGROUND OF THE INVENTION

A rotary piston engine has a toroidal cylinder in which pistons rotatively accelerate and decelerate cooperatively to form expansion and compression cycles. A rotary shaft extends along the axis of the toroidal cylinder and it is necessary to translate or convert the accelerating and decelerating motions of the pistons to or from the rotary shaft depending upon whether the engine is operating as a motor or a pump, it being understood that the rotary shaft rotates continuously in one direction.

The toroidal cylinder is provided with intake and exhaust ports and their location and the timing of the piston motions should permit the intended operation of the engine as smoothly and efficiently as possible and this depends largely on the means used for the translation or conversion of the accelerating and decelerating motions of the pistons to or from the rotary shaft. Preferably this means should be made as simple as possible, be capable of being engineered and manufactured in a practical manner, and be sturdy enough to resist the forces involved when functioning in its intended manner for long periods of service.

Obviously, the means used should operate smoothly and with great precision because the timing of the pistons' motions relative to the ports determines the commercial value of the engine. When operating as an internal combustion motor, spark plugs, or fuel injections if Diesel operation is involved, must be installed in the toroidal cylinder, and they must be considered also in connection with the timing of the piston cycles.

DESCRIPTION OF THE PRIOR ART

All known prior art means for interconnecting the pistons and shaft and effecting proper piston motion timing have involved complicated arrangements of crank shafts, cam shafts, push rods and the like, along with connecting rods and bearing assemblies or freewheeling clutches. The engineering and manufacture of such mechanisms for commercial engines has never proven feasible. Excessive friction forces have been involved.

In an effort to overcome these disadvantages rotary piston engines of the vane piston type have been proposed, but here again the mechanisms controlling the vane piston motions have presented problems preventing commercialization of such devices.

Therefore, in spite of the apparently attractive possibilities which seem inherent to rotary piston engines, none have ever become commercial realities, with the possible exception of the well-known Wankele engine which has sealing problems inherent to its design. A rotary piston engine using a toroidal cylinder containing pistons which are circular in cross section present no more sealing problems than in the case of pistons of the reciprocating type working in linear cylinders.

SUMMARY OF THE INVENTION

The object of the present invention is to provide a rotary piston engine, operative as either a motor or a pump, using a toroidal cylinder and pistons which slidingly fit this cylinder, and which provides for precise, smooth control over the relative accelerating and decelerating motions of the pistons, and which provides positive positioning control or timing of the pistons relative to the necessary exhaust and intake ports at their fixed locations and, of course, with respect to spark plugs or other combustion igniting means when the engine is operating as an internal combustion motor. In addition, the design of the engine, particularly its motion translating or converting means required between its accelerating and decelerating pistons and its rotary input or output power shaft, should be capable of the application of practical engineering principles and production in a manner permitting commercialization of the engine.

According to the present invention, this object is attained by the use of at least two pairs of oppositely positioned pistons which work in a toroidal cylinder, the pistons of each pair being interconnected by rotative radial members. These members may comprise disks which are rotatively free from the rotary input or output power shaft which extends along or on the toroidal cylinder's axis, this permitting the toroidal cylinder to be made with a slot in its inner periphery through which the disks extend to the pistons to result in the need for only three seals, one between the two disks and the others between the sides of the disks which slide in the slot. These are easily provided because only sliding motions are involved.

The means for forming the interconnection transmitting rotary force between the shaft and these radial members while the latter and their interconnected pistons alternately accelerate and decelerate when the shaft turns, comprise for each of the members a very simple and smoothly operating gear train of the epicyclic or planetary type.

This gear train includes, as to each of the radial members, an arm fixed to the shaft, as by being keyed to it, and extending radially therefrom, and an element rotatively carried transversely by the arm, the latter forming what is sometimes called an epicyclic gear train arm. The train further includes at least two intermeshing identical non-circular gears of which one is carried by the arm as a planet gear and is in rotative drive connection with the rotative element on the arm, and the other of which is fixed non-rotatively to revolve this planet gear at varying velocities when the shaft and arm turn together. Means are provided for forming a rotative drive connection between the element driven by the non-circular gears and the interconnected radial member, this being the member interconnected by this one gear train with the shaft. Keep in mind that there is one of these gear trains for each of the rotative radial members or disks used to interconnect a pair of the pistons.

The drive connection means between the rotative element carried by the arm and the radial piston-mounting member may be formed by at least two intermeshing circular gears of which one is fixed to the member to turn therewith and is concentric to its rotative axis, the other being carried by the arm as a planet gear and in rotative connection with the element.

This gear train may be made in a very simple manner by using only four gears, the two planet gears being directly interconnected by the rotative element carried by the arm. In other words, there need be only the two non-circular gears and the two circular gears, of which the gears forming planet gears are directly interconnected with each other and journaled by the gear train arm. With this concept engineering or technical design is simplified.

In particular, the non-circular gears are preferably elliptical gears, and as to one train, are differently phased with respect to those of the other train, this resulting, with proper gear design, in any desired acceleration or deceleration of the piston pairs.

The elliptical gears may be contoured to define the desired number of accelerating or decelerating motions of the radial members and their interconnected pistons, and therefore the number of cycles, for any one revolution of the rotary power shaft, and the circular gears may have a ratio defining predetermined maximum and minimum limits of these motions and therefore the length of the piston stroke of the engine.

Only the four gears for each pair of pistons are required, and these may be designed so that the pistons do not reciprocate but only accelerate or decelerate, so that as to any two adjacent pistons one decelerates while its opposing piston accelerates to a stroke determined by the ratio of the two circular gears controlling its movement limits, this piston, of course, decelerating while the first piston accelerates to in effect catch up with the slowed or stationary piston.

When used as an internal combustion motor with the cylinder having intake and exhaust ports and combustible charge igniting means all at fixed positions, the design of the gear trains may be such that during the compression cycle when two adjacent pistons confine a combustible charge with a confined volume determined by the design of the circular gears, the two charge-confining pistons may move simultaneously past the igniting means, providing during ignition a constant volume combustion chamber producing an effect close to the combustion efficiency of the well-known ideal Otto cycle.

Because of the uniqe gear trains which control the pistons motions, a new motor may be designed having a very long piston stroke permitting the transmission of a substantially constant torque to a rotary power shaft at all operating speeds so that in the case of an automotive application for example, the use of transmission gearing for obtaining a wide range of gear ratios may be eliminated. The effect obtained is somewhat like that of a steam engine.

DESCRIPTION OF THE DRAWINGS

Once the novel features of the present invention are understood, the necessary engineering and manufacturing details are within the ability of persons skilled in the art of motors, pumps and the like. Therefore, to disclose the novel features most effectively, the accompanying drawings are made entirely schematic in character, the proportions of some parts relative to others being exaggerated. With this understanding, a preferred embodiment of the invention is shown by the various views as follows:

FIG. 2 is a cross section of the new engine;

FIG. 3 is a development of the four gears on the gear train; and

DESCRIPTION OF THE PREFERRED EMBODIMENTS

Figure 4:
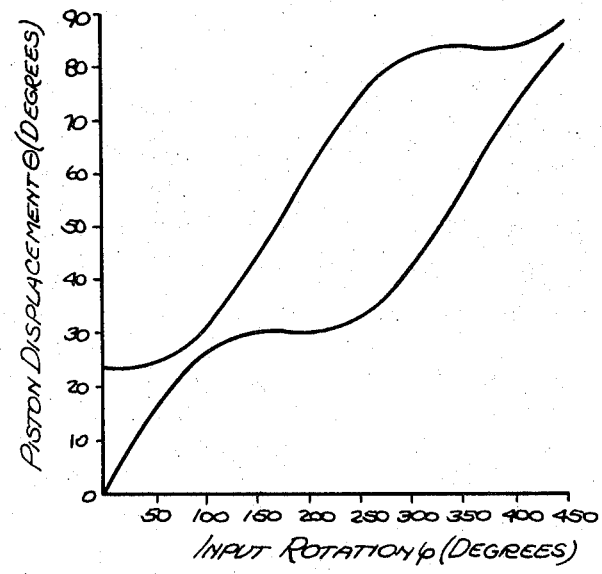
FIG. 4 is a graphical representation of the piston displacements or motions in degrees as resulting from the input or output rotary shaft rotation in degrees.

To understand the piston motions illustrated by FIG. 1 and graphically illustrated by FIG. 4, obtained by the new engine with its unique means for interconnecting the rotary shaft and the piston pairs, it is considered preferable to first provide a general overall picture of the engine.

As shown by any one of the FIG. 1 series and by FIG. 2, the engine includes the toroidal cylinder 1 having in its side wall three sets of exhaust and intake ports 2a and 3a, 2b and 3b and 2c and 3c, respectively, and appropriately positioned spark plugs 4a, 4b and 4c, the ports and spark plugs being arranged at 120° intervals around the cylinder 1 at locations described hereinafter. Two pairs of oppositely positioned double-ended pistons, A-B and C-D, respectively, slide in the cylinder 1, covering or uncovering the ports as valves when required, with the pistons of each pair interconnected by rotative radial members 5 and 6 respectively. In the FIG. 1 series these members are shown as spokes to clarify the operational phases but in an engineered version they would be circular disks, as represented in cross section in FIG. 2, sliding relative to each other in an annular slot formed in the inner periphery of the cylinder 1, with seals 7 between the members or disks 5 and 6 and between the latter and the cylinder slot sides, thus sealing the cylinder while permitting the accelerating or decelerating motions of the members or disks 5 and 6.

The rotary power output or input shaft 8 extends along the axis of the cylinder 1, it being journaled by an engine casing 9 which also supports or is integral with the cylinder 1. The members 5 and 6 may be journaled on this shaft 8 but in any event are rotatively free from this shaft. The unique means for interconnecting this shaft 8 and the members 5 and 6 which alternately accelerate and decelerate when the shaft turns, will be described hereinafter, and to aid in this the cycles effected by the piston motions and the operation of the engine in general should first be understood.

To operate as a pump, the intake ports, manifolded together if desired, would be the intake; the exhaust ports, also manifolded together if desired, would provide the output; the shaft being rotatively powered. To function as an internal combustion engine, or motor, the intake ports would be connected to a source of combustible fluid and air mixture, and the spark plugs, or other igniting means, would be connected to an appropriately timed high voltage electric power source. Depending on the design of the gear train, and for the arcuate length of the pistons, the pistons may provide any compression ratio desired, so Diesel operation is possible, in which event appropriately timed fuel injectors would be used.

Figures 1A, 1B, 1C, 1D, 1E, 1F:
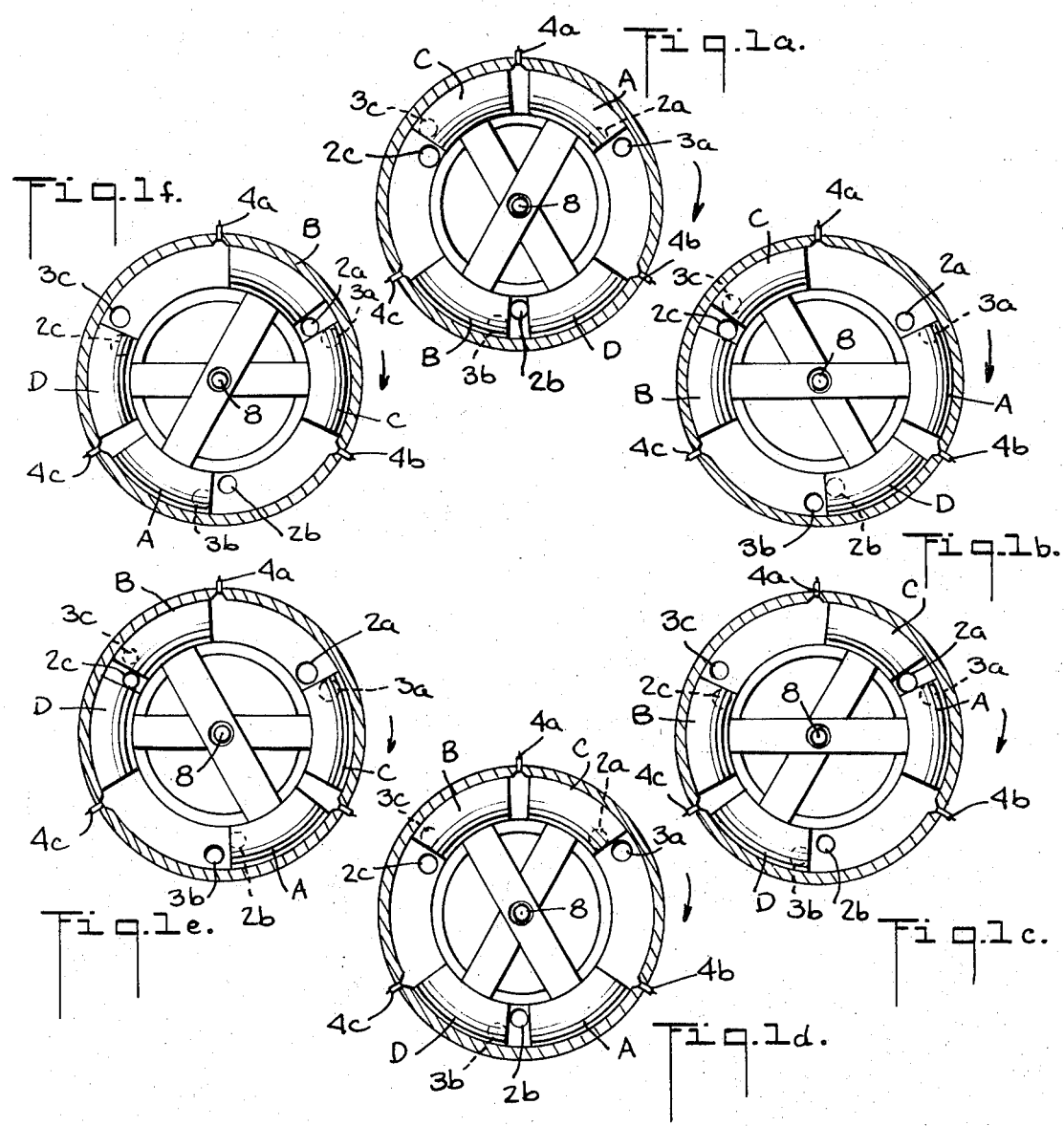
FIGS. 1a through 1f are a series of six views showing the movements of the piston pairs during three full revolutions of the power output or input shaft, these views being simulations of a section of the engine taken on a plane at right angles to its axis.

Assuming spark-timed internal combustion engine operation is involved, the operation for 3 full shaft rotations, shown by the FIG. 1 series drawings, is as follows:

FIG. 1a: piston C is at the end of a power stroke, has uncovered exhaust port 2c and has advanced to piston A and compressed a charge; plug 4a is ready to fire; piston D has been driven by piston C to piston B to force a fired charge through exhaust port 2b and to suck in a charge through intake port 3a while piston A covers the adjacent exhaust port 2a.

FIG. 1b: plug 4a has fired; pistons C and D continue at minimum velocity; piston A has been driven to accelerate and decelerate through its power stroke, uncovered exhaust port 2a and covered intake port 3a and compressed the charge against piston D; and piston B, driven by piston A, has forced out the fired charge, which had powered piston C, through exhaust port 2c while sucking in a charge through intake port 3b; plug 4b is now about to fire.

FIG. 1c: plug 4b has fired; piston D has been driven through its power stroke and has uncovered exhaust port 2b and compressed the charge previously sucked in by piston B while driving piston C to piston A to force out the previously fired charge through exhaust port 2a and suck in a charge through intake port 3c; plug 4c is now about to fire.

FIG. 1d: plug 4c has fired; piston B has been driven through its power stroke while pistons C and D remained at low velocity and piston B is now compressing a charge previously sucked in by piston C, while uncovering exhaust port 2c and driving piston A to piston D to force out the burnt charge fired by plug 4b, and suck in a new charge through intake port 3a; plug 4a is about to fire again.

FIG. 1e: plug 4a has fired for the second time; piston C is at end of its resulting power stroke and has uncovered exhaust port 2a and compressed against piston A the charge sucked in by this latter piston; piston C has driven piston D to force the burnt charge through exhaust port 2c and suck in a new charge through intake port 3b; plug 4b is ready to fire for a second time.

FIG. 1f: plug 4b has fired and piston A has accelerated and decelerated through its power stroke; exhaust port 2c is uncovered by piston A; piston A has compressed the charge previously sucked through intake port 3b by piston D and plug 4c is ready to fire again; piston B, driven by piston A, has forced the burnt charge through exhaust port 2a and sucked in a new charge through inlet port 3c.

During the foregoing cyclic phases the pistons may decelerate to a minimum velocity without stopping, the compressed charge sweeping past the firing plug. If desired, the pistons may stop completely. When any one piston is driven by the ignited expanding gases, it provides a steady power stroke of substantially uniform force and the piston behind it should remain at minimum velocity, or stationary, as long as possible to obtain the maximum effective stroke length. The accelerating and decelerating motions are accurately timed, smoothly effected, and under complete control by the gear trains illustrated by FIG. 2, and now described in detail as follows:

Each of the disks 5 and 6, which were represented as spokes in the FIG. 1 series, have identical gear trains. The disk 5 drives or is driven by the circular gear 10 fixed to it and concentric with the axis of the disk 5 and shaft 8. This gear 10 is in mesh with the circular gear 11 fixed to a rotary shaft 12 journaled by the train arm 13 which is fixed to the shaft 8. The non-circular gear 14 is also fixed on this shaft 12 and it is in mesh with the non-rotative gear 15 which is identical with the gear 14. The gear 15 is shown as being a part of or fixed to the casing 9. The disk 6 is provided with a duplicate gear train, the elements being correspondingly numbered, primed for identification.

The non-circular gears are usually elliptical and as the gears 14 and 14' run around the fixed gears 15 and 15' they accelerate and decelerate. These elliptical gear trains may be 180° out of phase with each other if the gears are 1st order elliptical gears, and 90° if of the 2nd order. Their design determines the number of piston accelerating and decelerating cycles per revolution of the shaft 8, and the rate or rapidity of acceleration and deceleration. The circular gear trains 10 and 11, and 10' and 11' by their gear ratio determine the piston stroke length from minimum to maximum and back to minimum.

To provide the cycles of the FIG. 1 series, the noncircular gears need be only slightly elliptical, and with counterbalancing and good engineering, a smooth running engine is obtained. The number of cycles, and of course of the ports and plugs may vary widely. The piston stroke for any practical design may be very long. The accelerating and decelerating motions may be very smooth and free from shock.

The graph of FIG. 4 serves to show the smooth gear action to be expected. In this graph the lower curve shows the flat piston dwell or minimum velocity period starting at about 140° shaft rotation and ending around the 220° area. The upper curve shows a corresponding flat dwell in the 320° to 410° area. The dwell time, or the flats on the graphed curves, should be as long as possible, because if an accelerating piston powered by a fired charge is followed too soon by the opposing piston, the effective piston stroke is diminished. However, a long, flat dwell time does not provide the smoothness obtainable by designing the gear trains to give only a reduced velocity during the times represented by the flats in the graphed curves. The graphed curve is the result obtainable when using elliptical gears of the 1st order and specified eccentricity.

The graphical representation of FIG. 4 is based on the following gear calculations which refer in part to the notations appearing in FIG. 3:

$$W_o/W_i = 1 - (N_4/N_5) \, 1 - \epsilon^2/1 + \epsilon^2 + 2\epsilon\cos \phi_i$$

(1)

where:
$W_i$ = input velocity (shaft rotation speed)
$W_o$ = output velocity (piston rotation speed)
$N_4$ = number of teeth on gear 11 (see FIG. 3)
$N_5$ = number of teeth on gear 10 (see FIG. 3)
$\epsilon$ = numerical eccentricity of the ellipse
$\epsilon = \sqrt{1 - (b/a)^2}$
$b$ = half the minor ellipse axis
$a$ = half the major ellipse axis
$\phi_i$ = instantaneous angle of rotation of the ellipse (1st order)

The angular displacement relationship is as follows:

$$\theta_o = \phi_i - 2 (N_4/N_5) \tan^{-1}(1 - \epsilon/1 + \epsilon) \tan \phi_i/2$$

(2)

where:
$\phi_i$ = input angular displacement

The relationship shown in Formula 2 relates output angle to input rotation with the parameters $N_4/N_5$ and $\epsilon$ defined previously.

The Angular Acceleration Relationship

Proceeding from the previous equation Formula 2 for the angular velocity relationship and differentiating it, the relationship is shown below:

$$\alpha_o = -2\ W_i^2\ (N_4/N_5)\ \epsilon(1 - \epsilon^2)\ \text{Sin}\ \phi_i/(1 + \epsilon^2 + 2\epsilon \cos \phi_i)^2$$

(3)

which gives the output angular acceleration $\alpha_o$ of gear 10 with constant angular velocity input.

Parametric Values — Ratio $N_4$ to $N_5$

The gear train will have a definite output displacement pattern as shown below:

| $\phi_i = 0$ | $\theta_o = 0$ |
|---|---|
| $\phi_i = 2\pi$ | $\theta_o = \pi/3$ |
| $4\pi$ | $= 2\pi/3$ |
| $6\pi$ | $\pi$ |
| $8\pi$ | $4\pi/3$ |
| $10\pi$ | $5\pi/3$ |
| $12\pi$ | $2\pi$ | which illustrates that for every six input revolutions the output gear will rotate once. In order to obtain the proper value of $N_4$ to $N_5$, let $\phi_i$ equal $2\pi$; then $$\pi/3 = 2\pi - 2\ (N_4/N_5)\pi$$

and $1 - N_4/N_5 = 1/6$ therefore $N_4/N_5 = 5/6$

Therefore, it is obvious that whatever the value of $\phi_i$ and the corresponding $\theta_o$ constituting the conditions as set out above, the relationship between $N_4$ and $N_5$ will always be determined and fixed. The value of $W_i$ being known, the only parameter to be determined is the eccentricity of the elliptical gears. In order to obtain the flat characteristics starting at about 140° to about 220° shaft rotation shown in FIG. 4, calculations show that the eccentricity is best when it equals .100. Under these conditions the curve does not show any appreciable departing from zero displacement in this range of shaft rotation nor is there any appreciable reversal between these points. The piston reversal would otherwise produce bad inertia reversals.

As previously suggested, it is considered preferable that the design of the gear train be such that the pistons do not become stationary but should only decelerate to a short low velocity period and then increase to a maximum and then decelerate again. Technical data is available permitting this by the calculation of trains for either 1st or 2nd order elliptical gears, and even other non-circular gears are possibilities.

An important feature of the present invention is the concept of the combination of the two elliptical gears, one fixed and the other a planet gear journaled on a train arm fixed to an input or output shaft, and which gears may be designed to provide a predetermined number of accelerating and decelerating cycles per shaft revolution or revolutions; with the two circular gears, one fixed to control the piston assembly and the other a planet gear driven by or driving the elliptical planet gear and which by their gear ratio determine the angular or rotative limits of the cycles; when used with an identical combination in suitably phased relationship; a rotary piston engine of practical design is made possible.

With the toroidal cylinder provided with intake and exhaust ports, fuel injectors or igniters, or the like, at necessarily fixed locations requiring the pistons at those locations to be in compression or expansion cycles or momentarily moving at the same speed relative to each other, these cycles or motions can be timed to occur precisely and smoothly at angular areas and within limits exactly positioned relative to such fixed position components.

If desired, each of the members 5 and 6 may carry more than one pair of pistons. The corresponding gear systems can be angularly phased so the piston pairs cooperate to provide the necessary cooperation between them with mid-points of the extremes of their accelerating, decelerating and lagging or stationary positions positively fixed, using known gear calculations. The two circular gears of each train by their ratio determine the angular extents of these motions. The lengths of the pistons may be designed to give the desired compression ratio. Since the limits of these motions are thus precisely fixed, the necessary fixed components, ports, igniting means, etc., may be precisely positioned.

There should be at least two pairs of pistons and their gear trains with the latter designed to provide at least one compression cycle and one expansion cycle without the pistons hitting each other, with appropriately registering exhaust and intake ports for the toroidal cylinder, to provide a useful engine.

When this new engine is used as an internal combustion engine designed so that a lagging but forwardly moving piston forms a compression zone between it and a piston ready to or starting to accelerate from its lagging but forwardly moving motion, with ignition of a charge occurring in this zone, excellent combustion can be anticipated. Because the cylinder is toroidal, ignition means may obviously be positioned in the cylinder's side at diametrically opposite positions at this zone to further assure complete combustion. Because the zone is moving during ignition, cooling occurs throughout an arcuate length of the cylinder, while the long possible piston stroke provides further cooling while assuring complete combustion of any possible initially unignited fuel components. Because of the long steady piston push obtained, the designed compression ratio may be lower than usual for reciprocating piston motors, further contributing to a cool exhaust and, of course, exhaust noise reduction.

In view of the above the emission of nitrogen oxides should be very low or non-existent because their formation results from high-temperature combustion. Hydrocarbon emission should likewise be very low, considering the complete combustion obtainable. As mentioned, exhaust noise is reduced.

What is claimed is:

1. A rotary piston engine including a substantially toroidal cylinder, a rotative shaft extending along the cylinder's axis, at least two pairs of oppositely positioned pistons in the cylinder with the pistons of each pair interconnected by rotative radial members, and means for forming an interconnection transmitting rotary force between the shaft and the members while the latter and their interconnected pistons alternately accelerate and decelerate when the shaft turns; wherein the improvement comprises said means for each member being formed by a gear train including an arm fixed to the shaft and extending radially therefrom, an element rotatively carried transversely by the arm, at least two intermeshing identical non-circular gears of which one is carried by the arm as a planet gear and is in rotative drive connection with said element and the other of which is fixed non-rotatively to revolve this planet gear at varying velocities when the shaft and arm turn, and means for forming a rotative drive connection between said element and the interconnected member.

2. The engine of claim 1 in which said drive connection means between the element and member includes at least two intermeshing circular gears of which one is fixed to the member and is concentric with its rotation axis and the other is carried by the arm as a planet gear and is in rotative connection with the element.

3. The engine of claim 1 in which the non-circular gears are substantially elliptical and as to one train are differently phased with respect to those of the other train.

4. The engine of claim 3 in which the elliptical gears are contoured to define a predetermined number of acceleration and deceleration motions of the members and their interconnected pistons for each complete revolution of the shaft, and the circular gears have a ratio defining predetermined maximum and minimum limits of said motions.

5. The engine of claim 4 having four gears, the planet gears being directly interconnected by said element and revolving on its axis.

6. The engine of claim 4 in which the cylinder has intake and exhaust ports covered and opened by the pistons and the timing of the gear trains and locations of these ports cause the pistons to go through the cycles of a four cycle internal combustion engine, the cylinders having means for igniting combustible charges during the compression cycles and the elliptical gears being contoured and timed so that each two adjacent pistons during these compression cycles move at substantially the same velocities to provide substantially constant volumes between them for a time permitting operation of the igniting means.

* * * * *